United States Patent [19]

Furue

[11] Patent Number: 4,777,418
[45] Date of Patent: Oct. 11, 1988

[54] MOTOR CONTROL METHOD AND APPARATUS

[75] Inventor: Ryosuke Furue, Kanagawa, Japan

[73] Assignee: Fuji Photo Film Co., Ltd., Kanagawa, Japan

[21] Appl. No.: 796,374

[22] Filed: Nov. 8, 1985

[30] Foreign Application Priority Data

Nov. 10, 1984 [JP] Japan ................. 59-237288

[51] Int. Cl.⁴ ............................................ G05B 19/19
[52] U.S. Cl. ................................... 318/603; 318/617; 318/561
[58] Field of Search ............... 318/603, 561, 618, 616, 318/617, 632

[56] References Cited

U.S. PATENT DOCUMENTS

| | | | |
|---|---|---|---|
| 4,282,469 | 8/1981 | Moriyama | 318/618 X |
| 4,486,693 | 12/1984 | Hamati et al. | 318/616 X |
| 4,593,237 | 6/1986 | Tanaka | 318/632 X |
| 4,594,536 | 6/1986 | Tamagaki | 318/561 |
| 4,651,073 | 3/1987 | Shimizu et al. | 318/632 |

*Primary Examiner*—Benjamin Dobeck
*Attorney, Agent, or Firm*—Sughrue, Mion, Zinn, Macpeak, and Seas

[57] ABSTRACT

A motor control method and apparatus incorporated in a feeding system. Information on a distance which an object is fed after the motor is commanded to stop and before it is actually stopped is determined in advance. Based on the distance information, a rotation stop signal is applied to the motor to stop the object in a desired position.

5 Claims, 4 Drawing Sheets

MOTOR CONTROL METHOD AND APPARATUS

BACKGROUND OF THE INVENTION

The present invention relates to a motor control method and apparatus, and more particularly to a method of and an apparatus for controlling a secondary scanning motor employed in a radiation image information readout device, a radiation image information recording device, a facsimile machine, or the like for reading or recording image and character information.

There have been developed radiation image information readout devices for reading radiation image information recorded on an image information carrier such as a stimulable phosphor sheet.

When a certain phosphor is exposed to a radiation such as X-rays, α-rays, β-rays, γ-rays, ultraviolet rays, or electron beams, the phosphor stores a part of the energy of the radiation. When the phosphor exposed to the radiation is exposed to stimulating rays such as visible light, the phosphor emits light in proportion to the stored energy of the radiation. The phosphor exhibiting such a property is referred to as a "stimulable phosphor".

The applicant has proposed radiation image readout systems employing a sheet of such a stimulable phosphor. The radiation image of an object such as a human body is recorded on the stimulable phosphor sheet, and then the stimulable phosphor sheet is exposed to stimulating light for emitting light therefrom which is read by a photoelectric transducer as an electric signal that is utilized for various diagnostic purposes. See for example U.S. Pat. Nos. 4,258,264, 4,276,473, and 4,315,318.

In one of the radiation image readout apparatus, the stimulable phosphor sheet is fed by a sheet feeder at a constant speed during which time the sheet is scanned with stimulating light one-dimensionally in a direction normal to the direction of feed of the sheet. The light emitted from the sheet upon exposure to the stimulating light is photoelectrically read to produce radiation image information in the form of an electric signal.

More specifically, the stimulable phosphor sheet is mechanically fed in one direction for secondary scanning thereof, while at the same time a light beam such as a laser beam is swept one-dimensionally over the sheet in the direction perpendicularly to the sheet feeding direction for primary scanning of the sheet. Therefore, the stimulable phosphor sheet is scanned two-dimensionally. The light emitted from the stimulable phosphor sheet is detected on a time series basis by a light detector such as a photomultiplier to produce image information.

For improving the readout accuracy, it has been proposed to make a mechanical improvement for feeding the stimulable phosphor sheet at a constant speed. In addition, it has also been proposed to feed the stimulable phosphor sheet in one direction for reading the radiation image in a pre-reading mode, and then feed the stimulable phosphor sheet in the opposite direction to read the radiation image in a main reading mode. Various readout conditions in the main reading mode can be established on the basis of information attained in the pre-reading mode.

The stimulable phosphor sheet is actually fed on an endless feed belt. Since it is necessary to keep the same laser beam scanning position in the pre-reading and main reading modes, the endless feed belt comprises a perforated endless belt and a suction box is disposed below the endless belt for attracting the stimulable phosphor sheet to the endless belt to maintain the sheet and the endless belt in the same relative position.

The stimulable phosphor sheet is however not attracted throughout its entire length along the direction of feed against the endless belt by the suction box. If the stimulable phosphor sheet were to be attracted fully along its entire length by the suction, the suction box would have to be larger in size and hence could not be unitized for greater compactness, and the suction device coupled to the suction box would have to be of a larger capacity, resulting in an increased cost of manufacture. When the pre-reading mode is finished, the stimulable phosphor sheet should be stopped in a position where at least a portion thereof is attracted by the suction box. If the stimulable phosphor sheet were fed away from such a position, then the endless belt and the stimulable phosphor sheet would not be kept in the same relative position. Any resulting positional deviation would cause an image to be differently scanned in the pre-reading and main reading modes, with the consequence that different contents of information would be read out.

To avoid the above drawback, the motor for driving the endless belt should be controlled so as not to overrun.

SUMMARY OF THE INVENTION

It is an object of the present invention to provide a method of and an apparatus for controlling a motor so as to prevent an object fed thereby from overrunning a prescribed stop position when the motor is de-energized.

Another object of the present invention is to provide a method of controlling a motor to stop its rotation when the motor is driven to rotate at a speed for feeding an object, the method comprising the steps of storing information representative of a distance which the object is fed after the motor is commanded to stop and before the motor is actually stopped, and applying a rotation stop command to the motor before the object is stopped at a target stop position by a time period corresponding to the stored information.

Still another object of the present invention is to provide an apparatus for controlling a motor, comprising a rising voltage source for applying a rising voltage to the motor, a rotational speed detector associated with the motor for detecting the speed of rotation of the motor, a counter for counting an output signal from the rotational speed detector, a setting unit for setting a preset count in the counter so that the counter generates a prescribed signal when the count of the counter reaches the preset count, speed indicating means for rotating the motor at a prescribed speed, and selector means for applying a drive signal to the motor through switching between the output signal from the rising voltage source and the output from the speed indicating means and for cutting off the drive signal to the motor in response to the prescribed signal generated by the counter.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
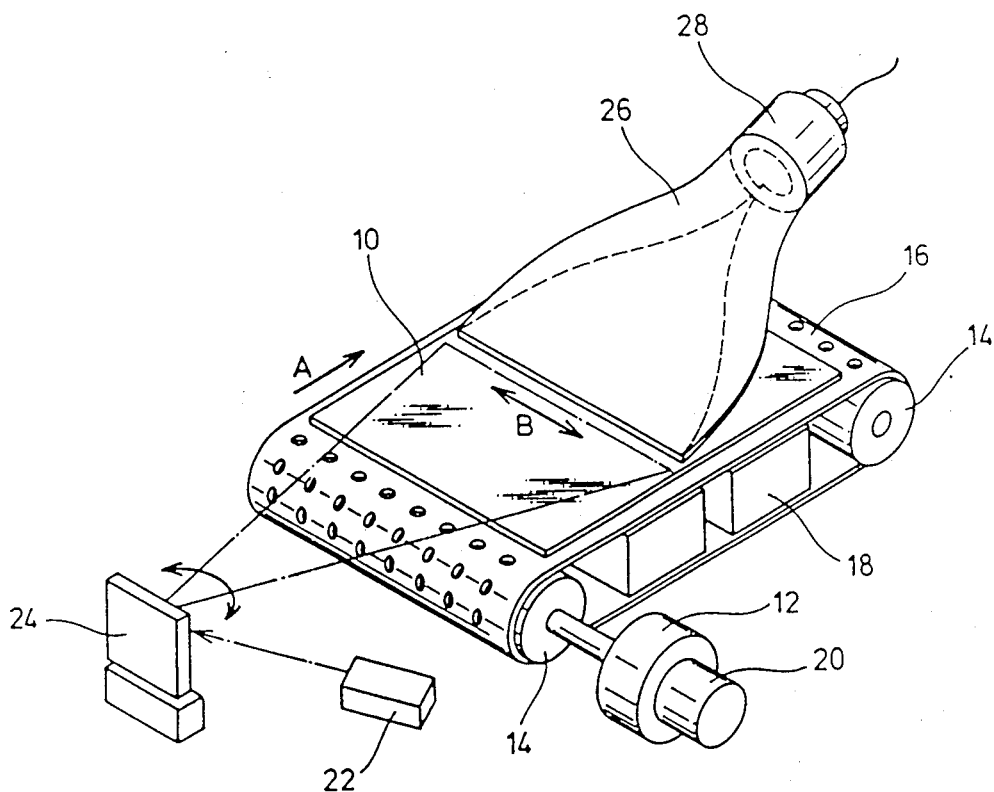
FIG. 1 is a schematic perspective view of a radiation image information readout device employing a motor control method of the present invention.

As shown in FIG. 1, a radiation image information readout device in which the present invention can be incorporated includes a stimulable phosphor sheet 10 serving as a recording medium on which a radiation image is recorded. Upon exposure to stimulating light in the form of a laser beam emitted from a laser beam source 22, the stimulable phosphor sheet 10 emits light which is photoelectrically read to obtain the radiation image information recorded on the sheet 10. The stimulable phosphor sheet 10 is fed in a secondary scanning direction indicated by the arrow A by an endless belt 16 trained around a pair of rollers 14, 14 one of which is driven by a motor 12. The belt 16 comprises a perforated suction belt having a plurality of holes defined therein, and a suction box 18 is disposed between the upper and lower runs of the belt 8, the suction box 18 has a suction port (not shown) communicating with the holes of the belt 16. When the suction box 18 is actuated, air is drawn by the suction box 18 through the belt holes for thereby positioning the stimulable phosphor sheet 10 on the belt 16 without slippage thereon.

The motor 12 is connected coaxially to a rotary encoder 20 serving as a distance detecting means for detecting the distance which the stimulable phosphor sheet 10 is fed.

The laser beam source 22 serving as a stimulating light source preferably comprises an He - Ne laser. The laser beam emitted from the laser beam source 22 is directed to a galvanometer mirror 24 which scans the laser beam in a main scanning direction indicated by the arrow B. The stimulable phosphor sheet 10 irradiated with the laser beam emits light commensurate with the image information recorded on the sheet 10. The light emitted from the sheet 10 is led by a light guide 26 to a photomultiplier 28 which converts the detected light into an electric signal that is displayed on a CRT or the like (not shown).

Figure 2:
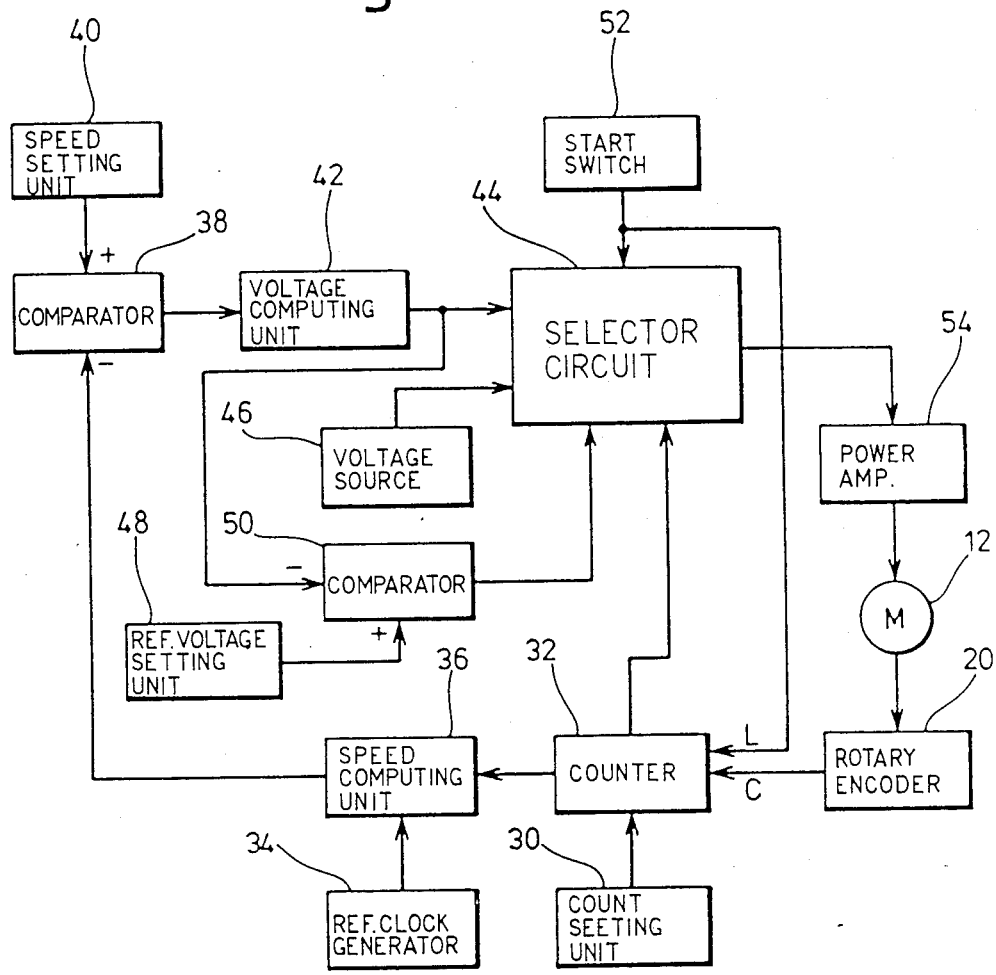
FIG. 2 is a block diagram of a circuit for effecting the motor control method of the invention.

FIG. 2 shows an electric circuit incorporated in the radiation image information readout device. The rotary encoder 20 generates output pulses C dependent on the rotational speed of the motor 12 through an output terminal connected to the input terminal of a presettable counter 32 in which a count can be preset by a count setting unit 30. The counter 32 counts the output pulses C from the rotary encoder 10. The counter 32 has an output terminal coupled to a speed computing unit 36 which computes the speed of movement of the endless belt 16, i.e., the speed of travel of the stimulable phosphor sheet 10 based on the count output from the counter 32 and reference clock pulses generated by a reference clock pulse generator 34. The speed computing unit 36 is arranged to detect a change in the count of the counter 32 between reference clock pulses as a speed signal. This is because the output pulses C from the rotary encoder 20 correspond to the rotational speed of the motor 12, and hence the count of the counter 32 corresponds to the distance which the stimulable phosphor sheet 10 is fed.

The speed computing unit 36 has an output terminal connected to one input terminal of a comparator 38 with its other input terminal coupled to the output terminal of a speed setting unit 40. The comparator 38 therefore detects the difference between the preset output from the speed setting unit 40 and the output from the speed computing unit 36, and applies the differential output to a voltage computing unit 42 which computes a voltage commensurate with the differential output and indicative of a speed. The speed-indicating voltage issued from the output terminal of the voltage computing unit 42 is applied to a selector circuit 44 as an input to be selected thereby. The output from a rising voltage source 46 is also applied to the selector circuit 44 as another input to be selected thereby.

The selector circuit 44 is connected to the output terminal of a comparator 50. The comparator 50 is supplied with a reference voltage from a reference voltage setting unit 48, the reference voltage being equal to the output voltage of the voltage computing unit 42 when the differential voltage from the comparator 38 is zero. The comparator 50 is also supplied with the output voltage from the voltage computing unit 42. The comparator 50 issues an output signal when the output voltage from the voltage computing unit 42 first coincides with the reference voltgage from the reference voltage setting unit 48.

The selector circuit 44 is also supplied with the output signal from a rotation start switch 52 and the count output signal from the counter 32. More specifically, the count output signal is generated by the counter 32 when the preset count preset by the count setting unit 00 is reached and is applied as a selection signal to the selector circuit 44. The selector circuit 44 is responsive to the output signal from the rotation start switch 52 for selecting and issuing out the voltage generated by the rising voltage source 46, and is also responsive to the output from the comparator 50 for selecting and issuing out the voltage generated by the output voltage from the voltage computing unit 42. The selector circuit 44 is also responsive to the count output from the counter 32 for stopping the selection of the output voltage from the voltage computing unit 42. The output signal from the selector circuit 44 is amplified by a power amplifier 54 and then applied to the motor 12.

Figure 3:
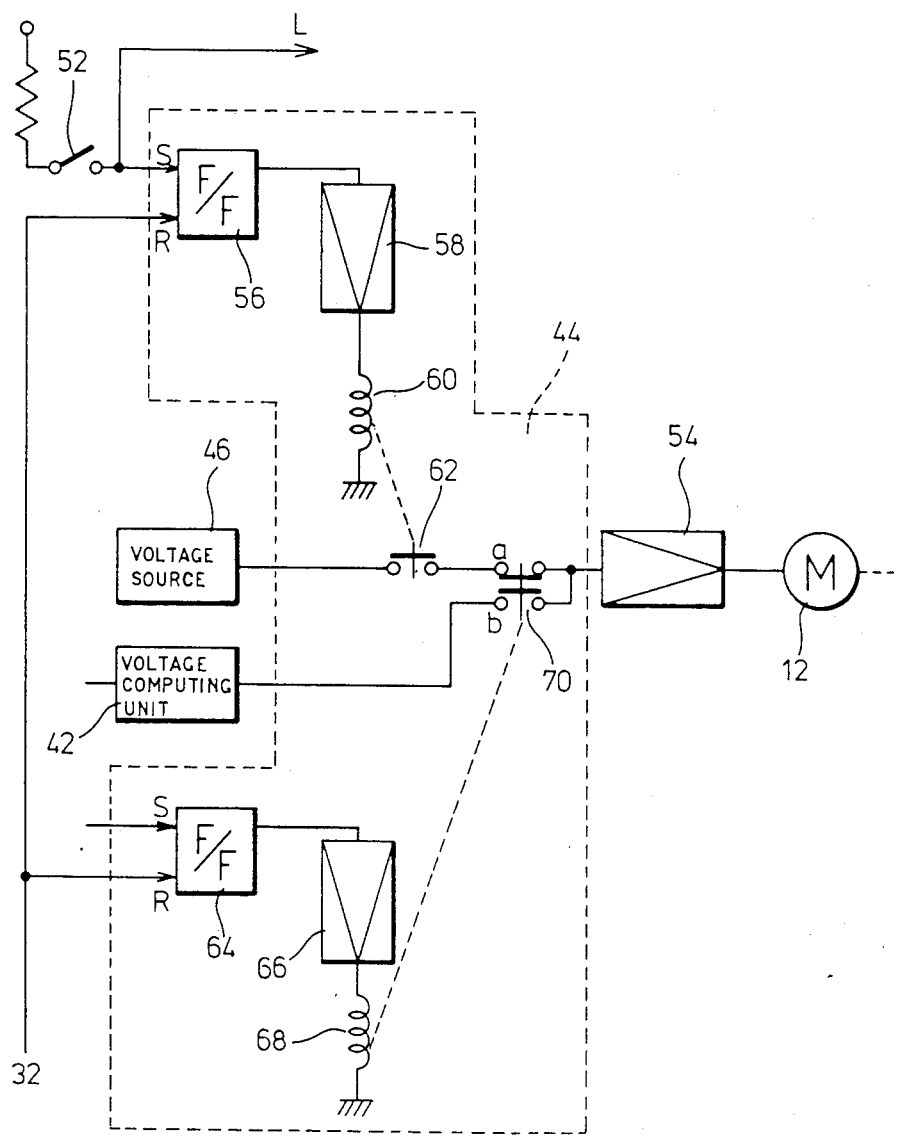
FIG. 3 is a block diagram of a selector circuit in the circuit shown in FIG. 2.

The selector circuit 44 is illustrated in greater detail in FIG. 3.

The rotation start switch 52 is connected to the SET terminal of a first flip-flop 56. The first flip-flop 56 has a RESET terminal supplied with the carry output signal from the counter 32. The first flip-flop 56 has its output terminal connected via a first driver 58 to a first relay coil 60 which, when energized, closes a first relay contact 62, the first relay coil 60 having one terminal grounded.

The output terminal of the comparator 50 is connected to the SET terminal of a second flip-flop 64. The second flip-flop 64 has a RESET terminal supplied with the carry output signal from the counter 32. The second flip-flop 64 has its output terminal connected via a second driver 66 to a second relay coil 68 which, when enerigzed, shifts a second relay contact 70, the second relay coil 68 has one terminal grounded. The rising voltage source 46 has its output terminal connected to the first relay contact 62 which is coupled to a side a of the second relay contact 70. The voltage computing unit 42 has its output connected to a side b of the second relay contact 70. The second relay contact 70 is coupled to the power amplifier 54.

Operation of the circuit shown in FIGS. 3 and 4 will be described below.

When the start switch 52 is temporarily turned on, the selector circuit 44 responds to the output signal from the start switch 52 for selecting the output voltage from the rising voltage source 46. More specifically, as the start switch 52 is closed, the first flip-flop 56 is set to supply an output signal to the first driver 58 to energize the first relay coil 60, thus closing the first relay contact 62. The rising voltage supplied from the rising voltage source 46 is applied through the first relay contact 62 and the second relay contact 70, which is now on the side a, to the power amplifier 54. The amplified output from the power amplifier 54 is applied to the motor 12 to energize the same. The rotational speed of the motor 12 is detected by the rotary encoder 20. The output pulses C from the rotary encoder 20 are counted by the counter 32 and the count from the counter 32 is converted by the speed computing unit 36 into a speed signal. The speed signal output from the speed computing unit 36 is compared with the speed setting from the speed setting unit 40 by the comparator 38, which detects the differential speed. The output of the voltage computing unit 42 is commensurate with the differential output from the comparator 38. When the output voltage from the voltage computing unit 42 first coincides with the output voltage from the reference voltage setting unit 48, the comparator 50 issues an output signal. In response to the output signal from the comparator 50, the selector circuit 44 selects the output signal from the voltage computing unit 42. The selected output is amplified by the power amplifier 54 and applied to the motor 12. More specifically, the output signal from the comparator 50 sets the second flip-flop 64 to enable the second driver 66 to energize the second relay coil 68. The second relay contact 70 is then shifted to the side b to cut off the output voltage from the rising voltage source 46 and to supply the output voltage from the voltage computing unit 42 to the power amplifier 54.

Figure 4:
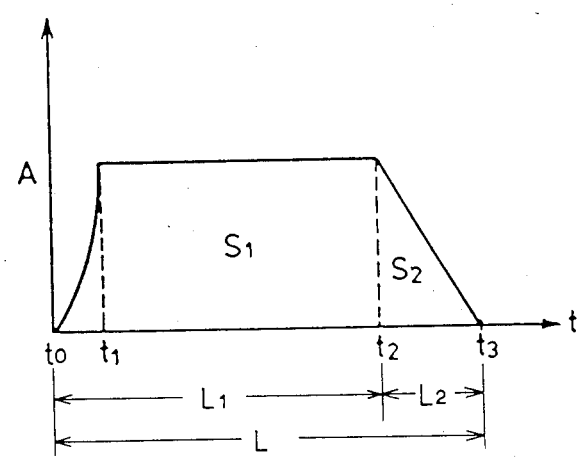
FIG. 4 is a graph showing a characteristic curve explanatory of operation of the method according to the invention.

As shown in FIG. 4, it is assumed that the start switch 52 is closed at $t=t_0$ and the comparator 50 generates its output at $t=t_1$. During the time period $t_0-t_1$, the voltage corresponding to the output voltage from the rising voltage source 46 is applied to the motor 12 for starting the motor 12 quickly. At $t=t_1$, the motor 12 reaches the rotational speed A preset by the speed setting unit 40. From $t=t_1$ on, the motor 12 is controlled by the output voltage from the voltage computing unit 42 to rotate at the RPM A corresponding to the preset output of the speed setting unit 40. The stimulable phosphor sheet 10 (FIG. 1) is now fed at a constant speed by the motor 12.

In response to the output signal from the start switch 52, the count set by the count setting unit 30 is loaded as a preset value in the counter 32. The count set by the count setting unit 30 is selected to be a count $S_1$ obtained by subtracting an output pulse count $S_2$ of the rotary encoder 20 which is generated after a rotation stop command is applied to the motor 12 and before the motor 12 is actually stopped, from an output pulse count S of the rotary encoder 20 which corresponds to the entire distance of feed of the stimulable phosphor sheet 10, dependent on the size thereof ($S_1=S-S_2$). To determine the output pulse count $S_2$, the stimulable phosphor sheet 10 is fed by th endless belt 16 at different constant speeds and then stopped, and output pulses from the rotary encoder 20 are counted after the motor 12 is commanded to stop and before it is actually stopped for each of the different constant speeds. Such different pulse counts are stored in advance in a memory means (not shown), and one of the stored pulse counts is selected as $S_2$ dependent on the feeding speed employed in an actual operation of the motor 12.

The counter 32 counts the output pulses of the rotary encoder 20 from the rotational speed A=0. When the count of the counter 32 reaches the preset value $S_1$ at $t=t_2$, the counter 32 issues a count output which enables the selector circuit 44 to stop the selection of the output voltage from the voltage computing unit 42. Specifically, the carry signal from the counter 32 resets the first and second flip-flops 56, 64, so that no input signal is fed to the power amplifier 54 and no voltage is applied to the motor 12. Alternatively, the motor 12 may be supplied with a reverse rotation at this time. As a result, the motor 12 is commanded to stop at $t=t_2$, and actually stopped at $t=t_3$. From $t=t_2$ to $t=t_3$, the stimulable phosphor sheet 10 travels a distance $L_2$ corresponding to the pulse count $S_2$. The distance $L_2$ is prevented from exceeding the entire distance L (corresponding to the pulse count S) which the stimulable phosphor sheet 10 is fed.

With the arrangement of the present invention, the motor is commanded to stop before an object fed thereby is supposed to move a distance, prior to reaching a prescribed stop position, after the rotation stop command is applied and until the motor is actually stopped. Therefore, the object is prevented from being fed beyond the prescribed stop position. Where the method of the invention is applied to an apparatus for reading out a recorded radiation image from a stimulable phosphor sheet, the stimulable phosphor sheet is stopped in the same position in the pre-reading and main reading modes, and recorded image information can accurately be read out at all times.

The principles of the present invention are not limited to the illustrated preferred embodiment, but are also applicable to other devices such as copying machines, facsimile machines, or the like.

Although a certain preferred embodiment has been shown and described, it should be understood that many changes and modifications may be made therein without departing from the scope of the appended claims.

What is claimed is:

1. An apparatus for controlling a motor, comprising:
   a rising voltage source for applying a rising voltage to the motor;
   a rotational speed detector associated with said motor for detecting the speed of rotation of the motor;
   a counter for counting an output signal from said rotational speed detector;
   a setting unit for setting a preset count in said counter so that said counter generates a prescribed signal when the count of said counter reaches said preset count;
   speed indicating means for rotating the motor at a prescribed speed; and
   selector means for applying a drive signal to the motor through switching between an output signal from said rising voltage source and the output signal from said speed indicating means and for cutting off said drive signal to the motor in response to said prescribed signal generated by said counter.

2. An apparatus according to claim 1, wherein said setting unit sets said preset count in said counter so that a rotation stop command is applied to said motor before the object is stopped at a target stop position by a time period corresponding to pre-counted information on a distance that an object driven by the motor is fed, and that said counter supplies said prescribed signal to said selector means for enabling the selector means to cut off said drive signal when the count of said counter reaches said preset count.

3. An apparatus according to claim 1, wherein said speed indicating means includes a comparator for comparing a speed indicating signal and a reference speed signal, said comparator being responsive to coincidence between said speed indicating signal and said reference speed signal for supplying a signal to said selector means, said selector means being responsive to said signal from said comparator for driving said motor through switching from the output signal from said rising voltage source to the output signal from said speed indicating means.

4. An apparatus according to claim 2, wherein said speed indicating means further includes a speed computing unit for converting the count of said counter into a speed signal, a speed setting unit for setting a speed of rotation of the motor, a comparator for generating an output indicative of the difference between the speed signal from said speed computing unit and the output signal from said speed setting unit, and a voltage computing unit responsive to the output signal of said comparator for generating said speed indicating signal.

5. An apparatus according to claim 1, wherein said object comprises a stimulable phosphor sheet, further including a belt conveyor drivable by said motor for feeding said stimulable phosphor sheet.

* * * * *